US010139601B2

United States Patent
Choi et al.

(10) Patent No.: US 10,139,601 B2
(45) Date of Patent: Nov. 27, 2018

(54) THIN TELEPHOTO LENS AND IMAGE PICKUP APPARATUS INCLUDING THE SAME

(71) Applicant: SAMSUNG ELECTRONICS CO., LTD., Suwon-si (KR)

(72) Inventors: Jong-Chul Choi, Suwon-si (KR); Harpal Singh Khing, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 14/996,750

(22) Filed: Jan. 15, 2016

(65) Prior Publication Data

US 2016/0327773 A1   Nov. 10, 2016

Related U.S. Application Data

(60) Provisional application No. 62/158,729, filed on May 8, 2015.

(30) Foreign Application Priority Data

Jul. 23, 2015   (KR) .......................... 10-2015-0104354

(51) Int. Cl.
*G02B 13/00* (2006.01)
*G02B 17/08* (2006.01)
(Continued)

(52) U.S. Cl.
CPC ......... *G02B 13/0065* (2013.01); *G02B 13/02* (2013.01); *G02B 17/086* (2013.01); *G02B 27/646* (2013.01)

(58) Field of Classification Search
CPC .......... G02B 27/646; G02B 7/08; G02B 7/09; G02B 7/023; G02B 15/173; G02B 15/20;
(Continued)

(56) References Cited

U.S. PATENT DOCUMENTS 4,249,798 A   2/1981 Moskovich
8,107,004 B2   1/2012 Nomura et al.
(Continued)

FOREIGN PATENT DOCUMENTS

JP   7-140518 A   6/1995
JP   2004-348082 A   12/2004
(Continued)

*Primary Examiner* — William Choi
*Assistant Examiner* — Sharrief Broome
(74) *Attorney, Agent, or Firm* — Sughrue Mion, PLLC

(57) ABSTRACT

Provided is a telephoto lens including a first lens group, the first lens group including: a first lens element including: an object side lens surface facing an object side; and an image side lens surface facing an image side; and a prism configured to bend an optical path within the first lens element, wherein the first lens element and the prism are formed as a single body, wherein an inclined surface of the prism is provided between the object side lens surface and the image side lens surface, and wherein the following relationship is satisfied: 1.3≤L1/Li, where L1 corresponds to a length of an optical path within the first lens element along an optical axis of the first lens elements and Li corresponds to a length of an optical path between an optical element provided closest to an image plane and the image plane along the optical axis.

31 Claims, 11 Drawing Sheets

(51) Int. Cl.
*G02B 13/02* (2006.01)
*G02B 27/64* (2006.01)

(58) Field of Classification Search
CPC ...... G02B 13/009; G02B 15/177; G02B 7/04; G02B 27/0025; G02B 7/102; G02B 13/001; G02B 15/14; G02B 7/10; G02B 13/18; G02B 7/02; G02B 9/64; G02B 13/0065

See application file for complete search history.

(56) References Cited

U.S. PATENT DOCUMENTS

| | | | |
|---|---|---|---|
| 2005/0018313 A1* | 1/2005 | Kuba | G02B 13/002 359/676 |
| 2012/0075518 A1 | 3/2012 | Okuda | |
| 2014/0307331 A1 | 10/2014 | Kudoh | |

FOREIGN PATENT DOCUMENTS

| | | |
|---|---|---|
| JP | 4281307 B2 | 6/2009 |
| JP | 4869522 B2 | 2/2012 |

\* cited by examiner

YZ PLANE VIEW

XZ PLANE VIEW

THIN TELEPHOTO LENS AND IMAGE PICKUP APPARATUS INCLUDING THE SAME

CROSS-REFERENCE TO RELATED APPLICATION

This application claims priority from U.S. Provisional Patent Application No. 62/158,729, filed on May 8, 2015 in U.S.A. Patent and Trademark Office and Korean Patent Application No. 10-2015-0104354, filed on Jul. 23, 2015, in the Korean Intellectual Property Office, the disclosures of which are incorporated herein by reference in their entireties.

BACKGROUND

1. Field

Apparatuses consistent with exemplary embodiments relate to a thin telephoto lens and an image pickup apparatus including the same, and more particularly, to a telephoto lens that is thin enough to be used in a mobile device and an image pickup apparatus including the thin telephoto lens.

2. Description of the Related Art

A zoom lens including a refractive optical system is usually long and heavy, and a length of such zoom lens changes while a focal length is adjusted, and thus it is difficult to mount an optical zoom lens in a very thin mobile device such as a mobile phone. Recently, zoom lenses of various forms that are thin and have a minimized volume have been suggested, but the suggested zoom lenses are not yet compact enough to be used in a mobile device. Moreover, an F-number of the zoom lenses is increased, and the increased F-number may darken images. Due to this reason, a fixed focus lens is still typically used in a mobile device.

However, a fixed focus lens has a fixed angle of view, and thus, it is difficult to create diverse effects when capturing an image using the fixed focus lens. In particular, a camera for mobile devices is generally designed to be suitable for short-range photographing, and thus may not be suitable for long-distance photographing. Accordingly, instead of using a zoom lens, two fixed focus lenses, that is, a wide-angle lens and a telephoto lens have been recently used together to provide zoom effects.

SUMMARY

Additional aspects will be set forth in part in the description which follows and, in part, will be apparent from the description, or may be learned by practice of the presented exemplary embodiments.

According to an aspect of an exemplary embodiment, a telephoto lens includes a first lens group including a first lens element having an object side lens surface facing an object side and an image side lens surface facing an image side and a prism configured to bend an optical path, wherein the first lens element is formed as a single body with the prism such that an inclined prism surface is between the object side lens surface and the image side lens surface. Here, an optical length L1 of an optical path within the first lens element along a central axis and an optical length Li of an optical path from a last optical element to an image plane in a direction towards the image side of the telephoto lens may be configured to satisfy a relationship of $1.3 \leq L1/Li$.

The optical length L1 of the optical path within the first lens element along the central axis and a smallest effective aperture $D1\_s$ of the first lens element may be configured to satisfy a relationship of $L1/D1\_s \geq 1$.

A total length TTL of the telephoto lens and an effective focal length EFL of the telephoto lens may be configured to satisfy a relationship of $1 < TTL/EFL \leq 2$.

The telephoto lens may further include a second lens group and a third lens group sequentially disposed next to the first lens group in a direction from the object side to the image side, wherein the second lens group has a positive refractive power.

The second lens group may include a second lens element and a third lens element sequentially disposed in a direction from the object side to the image side, wherein the second lens element has a positive refractive power and the third lens element has a negative refractive power.

The second lens group may be configured to be displaced in a direction perpendicular to an optical axis so as to correct vibration.

The third lens group may be configured to be displaced according to an optical axis so as to perform a focusing function.

The third lens group may include a fourth lens element and a fifth lens element sequentially disposed in a direction from the object side to the image side, wherein the fourth lens element and the fifth lens element are meniscus lenses having a convex surface facing the object side and a concave surface facing the image side.

The first lens element may have a negative refractive power, and the fourth lens element may have a negative refractive power, and the fifth lens element may have a positive refractive power, and the object side lens surface of the first lens element may be a concave surface.

For example, a focal length of the telephoto lens may be equivalent to a focal length less than 120 mm in a 35 mm film format.

The first lens element may have a positive refractive power, and the fourth lens element may have a positive refractive power, and the fifth lens element may have a negative refractive power, and the object side lens surface of the first lens element may be a convex surface.

A focal length of the telephoto lens may be equivalent to a focal length greater than 120 mm in a 35 mm film format.

The telephoto lens may further include a mirror between the fifth lens element and the image plane, wherein the mirror bends the optical path.

The telephoto lens may further include a low-pass filter between the fifth lens element and the image plane, the low-pass filter passing rays having a shorter wavelength than infrared rays but blocking infrared rays.

The optical length Li of the optical path from the last optical element of the telephoto lens to the image plane corresponds to an optical length of an optical path from the low-pass filter to the image plane.

The low-pass filter may be disposed on the image plane, and the optical length Li of the optical path from the last optical element of the telephoto lens to the image plane may correspond to an optical length of an optical path from the fifth lens element to the low-pass filter.

The telephoto lens may further include an aperture stop placed next to the first lens group in a direction from the object side to the image side, the aperture stop having a greater diameter in a width direction than in a height direction of the telephoto lens.

The aperture stop may have an oval shape or a shape formed by cutting out upper or lower portions of a circle.

A diameter Ra of the aperture stop in a short axis direction and a focal length f of the telephoto lens may be configured to satisfy a relationship of Ra≥f/6.

According to an aspect of another exemplary embodiment, there is provided an image pickup apparatus including: at least one wide-angle lens; and at least one telephoto lens. The at least one telephoto lens may include a first lens group including a first lens element having an object side lens surface facing an object side and an image side lens surface facing an image side and a prism configured to bend an optical path, wherein the first lens element is formed as a single body with the prism such that an inclined prism surface is between the object side lens surface and the image side lens surface. Here, an optical length L1 of an optical path in the first element along a central axis and an optical length Li of an optical path from a last optical element to an image plane in a direction towards the image side of the telephoto lens may satisfy a relationship of 1.3≤L1/Li.

In addition, image deterioration of an actually captured image in a vertical direction may be compensated by referring to a difference between a point spread function (PSF) value of the telephoto lens in a horizontal direction and a PSF value of the telephoto lens in a vertical direction.

According to an aspect of another exemplary embodiment, there is provided a telephoto lens including a first lens group, the first lens group including: a first lens element including: an object side lens surface facing an object side; and an image side lens surface facing an image side; and a prism configured to bend an optical path within the first lens element, wherein the first lens element and the prism are formed as a single body, wherein an inclined surface of the prism is provided between the object side lens surface and the image side lens surface, and wherein the following relationship is satisfied: 1.3≤L1/Li, where L1 corresponds to a length of an optical path within the first lens element along an optical axis of the first lens elements and Li corresponds to a length of an optical path between an optical element provided closest to an image plane and the image plane along the optical axis.

The prism may be configured to bend a first optical path entering through the object side lens surface to a second optical path exiting through the image side lens surface.

The first optical path may extend in a substantially perpendicular direction from the second optical path.

The following relationship may be satisfied: L1/D1_s≥1, where D1_s corresponds to a smallest effective aperture of the first lens element.

The following relationship may be satisfied: 1<TTL/EFL≤2, where TTL corresponds to a total length of the telephoto lens and EFL corresponds to an effective focal length.

The telephoto lens may further include: a second lens group; and a third lens group, the second and the third lens groups sequentially disposed next to the first lens group in a direction from the object side to the image side, wherein the second lens group has a positive refractive power.

The second lens group may include: a second lens element; and a third lens element, the second and the third lens elements sequentially disposed in the direction from the object side to the image side, wherein the second lens element has a positive refractive power and the third lens element has a negative refractive power.

The second lens group may be configured to be displaced in a direction perpendicular to the optical axis so as to correct vibration of the telephoto lens.

The third lens group may be configured to be displaced along the optical axis so as to perform a focusing function.

The third lens group may include: a fourth lens element; and a fifth lens element, the fourth and the fifth lens elements sequentially disposed in the direction from the object side to the image side, wherein each of the fourth lens element and the fifth lens element includes a meniscus lens having a convex surface facing the object side and a concave surface facing the image side.

The first lens element may have a negative refractive power, wherein the fourth lens element may have a negative refractive power, wherein the fifth lens element may have a positive refractive power, and wherein the object side lens surface of the first lens element may include a concave surface.

A focal length of the telephoto lens may be equivalent to a focal length less than 120 mm in a 35 mm film format.

The first lens element may have a positive refractive power, the fourth lens element may have a positive refractive power, the fifth lens element may have a negative refractive power, and wherein the object side lens surface of the first lens element may include a convex surface.

A focal length of the telephoto lens may be equivalent to a focal length greater than 120 mm in a 35 mm film format.

The telephoto lens may further include a mirror between the fifth lens element and the image plane, wherein the mirror bends the optical path between the optical element provided closest to the image plane and the image plane.

The telephoto lens may further include a low-pass filter provided between the fifth lens element and the image plane, the low-pass filter configured to pass rays having a shorter wavelength than infrared rays and configured to block infrared rays.

The optical element provided closest to the image plane may correspond to the low-pass filter.

The low-pass filter may be disposed on the image plane, and the length Li may correspond to a length of an optical path between the fifth lens element and the low-pass filter.

The telephoto lens may further include an aperture stop provided between the first lens group and a second lens group, the second lens group sequentially disposed next to the first lens group in a direction from the object side to the image side, wherein the aperture stop may have a first length extending in a first direction and a second length extending in a second direction perpendicular to the first direction of the telephoto lens, the first length being greater than the second length.

The aperture stop may have an oval shape or a shape formed by cutting out upper or lower portions of a circle.

The following relationship is satisfied: Ra≥f/6, where Ra corresponds to a length of the aperture stop in the second direction and f corresponds to a focal length of the telephoto lens.

According to an aspect of another exemplary embodiment, there is provided an image pickup apparatus including: at least one wide-angle lens; and at least one telephoto lens, wherein the at least one telephoto lens includes a first lens group including: a first lens element having: an object side lens surface facing an object side; and an image side lens surface facing an image side; and a prism configured to bend an optical path with the first lens element, wherein the first lens element and the prism are formed as a single body, wherein an inclined surface of the prism is provided between the object side lens surface and the image side lens surface, and wherein the following relationship is satisfied: 1.3≤L1/Li, where L1 corresponds to a length of an optical path within the first lens element along an optical axis of the first lens elements and Li corresponds to a length of an optical path between an optical element provided closest to an image plane and the image plane along the optical axis.

The prism may be configured to bend a first optical path entering through the object side lens surface to a second optical path exiting through the image side lens surface.

The first optical path may extend in a substantially perpendicular direction from the second optical path.

The image pickup apparatus may further include an aperture stop provided between the first lens group and a second lens group, the second lens group sequentially disposed next to the first lens group in a direction from the object side to the image side, wherein the aperture stop has a first length extending in a first direction and a second length extending in a second direction perpendicular to the first direction of the telephoto lens, the first length being greater than the second length.

The following relationship may be satisfied: $Ra \geq f/6$, where Ra corresponds to a length of the aperture stop in the second direction and f corresponds to a focal length of the telephoto lens.

The image pickup apparatus may be configured to compensate image deterioration of a captured image in a vertical direction based on a difference between a point spread function (PSF) value of the telephoto lens in a horizontal direction and a PSF value of the telephoto lens in the vertical direction.

BRIEF DESCRIPTION OF THE DRAWINGS

The above and/or other aspects of the disclosure will become apparent and more readily appreciated from the following description of the exemplary embodiments, taken in conjunction with the accompanying drawings in which.

DETAILED DESCRIPTION

Figure 1:
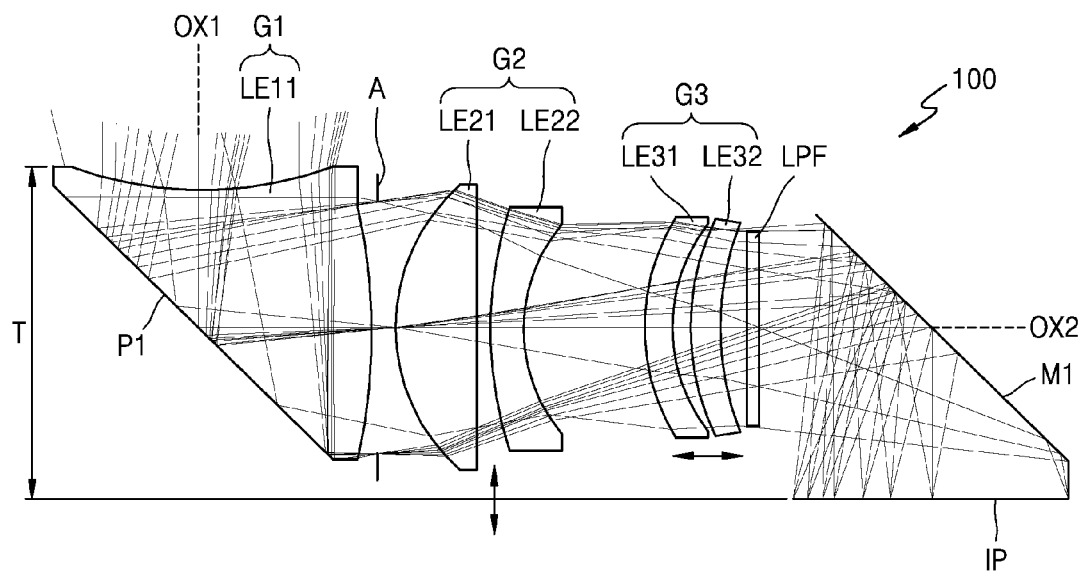
FIG. 1 is a cross-sectional view of a thin telephoto lens according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

Thin telephoto lenses and an image pickup apparatus including the thin telephoto lenses will now be described according to exemplary embodiments with reference to the accompanying drawings. In the drawings, like reference numerals refer to like elements, and sizes of respective elements may be exaggerated for clarity and convenience of description. It will also be understood that when an element is referred to as being "on" or "on top of" another element in regard to description of a layer structure below, it can be directly on the other element, or intervening elements may also be present.

FIG. 1 is a cross-sectional view of a thin telephoto lens 100 according to an exemplary embodiment. The thin telephoto lens 100 may include a first lens group G1, a second lens group G2, and a third lens group G3 sequentially arranged in a direction from an object side to an image side. Also, the thin telephoto lens 100 may further include an aperture stop A between the first lens group G1 and the second lens group G2 and a low-pass filter LPF between the third lens group G3 and an image plane IP. The low-pass filter LPF may, for example, pass through only rays having a shorter wavelength than infrared rays but block infrared rays.

The first lens group G1 may include a first lens element LE11. As illustrated in FIG. 1, the first lens element LE11 may be formed as a single body with a prism P1 to perpendicularly bend an optical path at about 90 degrees. A thickness T of the thin telephoto lens 100 may be significantly reduced due to the prism P1 bending the optical path at 90 degrees. Moreover, as the first lens element LE11 and the prism P1 are combined as a single body, the thickness T of the thin telephoto lens 100 may be further reduced. For example, an inclined surface of the prism P1 may be integrally combined between an object side lens surface of the first lens element LE11 disposed towards the object side and an image side lens surface of the first lens element LE11 disposed towards the image side. Accordingly, an optical axis OX1 of the object side lens surface of the first lens element LE11 and an optical axis OX2 of the image side lens surface of the first lens element LE11 may be perpendicular to each other. Hereinafter, the optical axis OX2 will be referred to as a main axis.

A refractive power of the first lens group G1 may be differently set according to a focal length of the thin telephoto lens 100. For example, if a focal length of the thin telephoto lens 100 is short and thus light of a wide angle of view is incident on the first lens group G1, an incidence angle is large, and thus, it may be advantageous to reduce a refraction angle in order to secure performance of the thin telephoto lens 100. If a focal length of the thin telephoto lens 100 is long and thus light of a small angle of view is incident on the first lens group G1, an incidence angle may be small and thus it may be advantageous to increase a refraction angle in order to secure performance of the thin telephoto lens 100. Thus, the first lens group G1 may be designed to have a negative (−) refractive power as the focal length of the thin telephoto lens 100 decreases, and the first lens group G1 may be designed to have a positive (+) refractive power as the focal length of the thin telephoto lens 100 increases.

For example, if a focal length of the thin telephoto lens 100 is equivalent to a focal length of about 120 mm or less in a 35 mm film format, the first lens group G1 may have a negative refractive power, and particularly, a first lens surface of the first lens group G1 (that is, the object side lens surface of the first lens element LE11) may be concave. If a focal length of the thin telephoto lens 100 is equivalent to a focal length of about 120 mm or greater in a 35 mm film format, the first lens group G1 may have a positive refractive power, and particularly, the first lens surface of the first lens group G1 (that is, the object side lens surface of the first lens element LE11) may be convex. If a focal length of the thin telephoto lens 100 is equivalent to a focal length of about 120 mm in a 35 mm film format, the first lens group G1 may have a refractive power close to 0, and the first lens surface of the first lens group G1 (that is, the object side lens surface of the first lens element LE11) may be almost planar.

The second lens group G2 disposed immediately behind the aperture stop A may have a positive refractive power. Also, the second lens group G2 may include a second lens element LE21 having a positive (+) refractive power and a third lens element LE22 having a negative (−) refractive power. A light ray having an angle reduced due to the first lens element LE11 passes the aperture stop A to be diverged, and thus, the second lens element LE22 immediately behind the aperture stop A with respect to a propagation direction of light may converge a light ray by using the positive refractive power, and the third lens element LE22 next to the second lens element LE21 may reduce an angle between the light ray and the main axis OX2 by using the negative refractive power. While the second lens element LE21 is illustrated as a single lens in FIG. 1, the second lens element LE21 may also be designed as dual lenses by considering the manufacture and the shape thereof.

Also, the second lens group G2 may be designed to perform a vibration correction function. For example, the second lens group G2 may be configured to be displaced in a direction perpendicular to the main axis O2 so as to correct vibration. The second lens element LE21 and the third lens element LE22 of the second lens group G2 may be displaced together or one of the second lens element L21 and the third lens element LE22 may be displaced. Alternatively, instead of displacing the second lens group G2, an image sensor placed on the image plane IP may be displaced in a direction perpendicular to the main axis OX2 so as to perform a vibration correction function.

The third lens group G3 placed next to the second lens group G2 in a light propagation direction may include a fourth lens element LE31 and a fifth lens element LE32. The third lens group G3 may perform a focusing function. To this end, the third lens group G3 may be moved to the image side along the main axis OX2 when focusing is performed from an infinite range to a finite object distance. For example, during focusing, the fourth lens element LE31 and the fifth lens element LE32 may be configured to be displaced along the main axis OX2, and the first and second lens groups G1 and G2 may be fixed. To allow a focusing function, the fourth lens element LE31 and the fifth lens element LE32 may have a meniscus shape. For example, the fourth lens element LE31 and the fifth lens element LE32 may be both meniscus lenses having a convex surface facing the object side and a concave surface facing the image side.

Refractive powers of the fourth lens element LE31 and the fifth lens element LE32 of the third lens group G3 may be differently designed according to a focal length of the thin telephoto lens 100. For example, if a focal length of the thin telephoto lens 100 is short, it may be advantageous when the fourth lens element LE31 has a negative refractive power and the fifth lens element LE32 has a positive refractive power. On the other hand, if a focal length of the thin telephoto lens 100 is long, the fourth lens element LE31 may have a positive refractive power and the fifth lens element LE32 may have a negative refractive power. For example, if a focal length of the thin telephoto lens 100 is equivalent to a focal length of about 120 mm or less in a 35 mm film format, the fourth lens element LE31 may have a negative refractive power and the fifth lens element LE32 may have a positive refractive power. If a focal length of the thin telephoto lens 100 is equivalent to a focal length of about 120 mm or greater in a 35 mm film format, the fourth lens element LE31 may have a positive refractive power and the fifth lens element LE32 may have a negative refractive power.

The low-pass filter LPF may be placed next to the third lens group G3 in the light propagation direction. A mirror M1 that reflects light that passed through the low-pass filter LPF and then bends an optical path at about 90 degrees may be placed next to the low-pass filter LPF. Thus, after being reflected on the mirror M1, the light may be focused on the image plane IP. While the low-pass filter LPF is illustrated as being placed in front of the mirror M1 in FIG. 1 for convenience, a location of the low-pass filter LPF is not limited. For example, the low-pass filter LPF may be placed behind the mirror M1, or particularly, immediately in front of the image plane IP. When the low-pass filter LPF is placed immediately in front of the image plane IP, the low-pass filter LPF may contact a surface of an image sensor package (not shown) placed on the image plane IP so as to also function as a protection glass protecting a sensor surface of an image sensor.

The optical path is bent using the mirror M1 in order to further reduce the thickness T of the thin telephoto lens 100. Typically, a size of the image sensor package placed on the image plane IP is greater than diameters of the lens elements LE11, LE21, LE22, LE31, and LE32 of the thin telephoto lens 100. Thus, when the image plane IP is placed to be perpendicular to the main axis OX2 of the thin telephoto lens 100, the thickness T of the thin telephoto lens 100 is determined by the size of the image sensor package placed on the image plane IP. However, when the image plane IP is placed to be parallel to the main axis OX2 by using the mirror M1, the thickness T1 of the thin telephoto lens 100 may not be determined by the size of the image sensor package. In this case, the thickness T of the thin telephoto lens 100 may be determined by a lens element having a largest diameter among the lens elements LE11, LE21, LE22, LE31, and LE32. If the size of the image sensor package is smaller than a diameter of a lens element having a largest diameter among the lens elements LE11, LE21, LE22, LE31, and LE32, the mirror M1 may not be used. In the case where the size of the image sensor package is smaller than the lens elements LE11, LE21, LE22, LE31, and LE32, the image plane IP may be disposed to be perpendicular to the main optical axis OX2.

According to the exemplary embodiments, in order to minimize a volume of the thin telephoto lens 100 by reducing the overall length of the thin telephoto lens 100, a relationship between a length of an optical path along a central axis in the first optical element of the first lens group G1 and a length of an optical path from the last optical element to the image plane IP in a direction towards the image side of the thin telephoto lens 100 may be limited. For convenience of description, FIG. 2 which is a cross-sectional view of a telephoto lens equivalent to the thin telephoto lens 100 of FIG. 1 will be referred to. The telephoto lens illustrated in FIG. 2 is optically identical to the thin telephoto lens 100 of FIG. 1 except that an optical path is not bent in the first lens group G1 and that an optical path between the third lens group G3 and the image plane IP is not bent.

Figure 2:
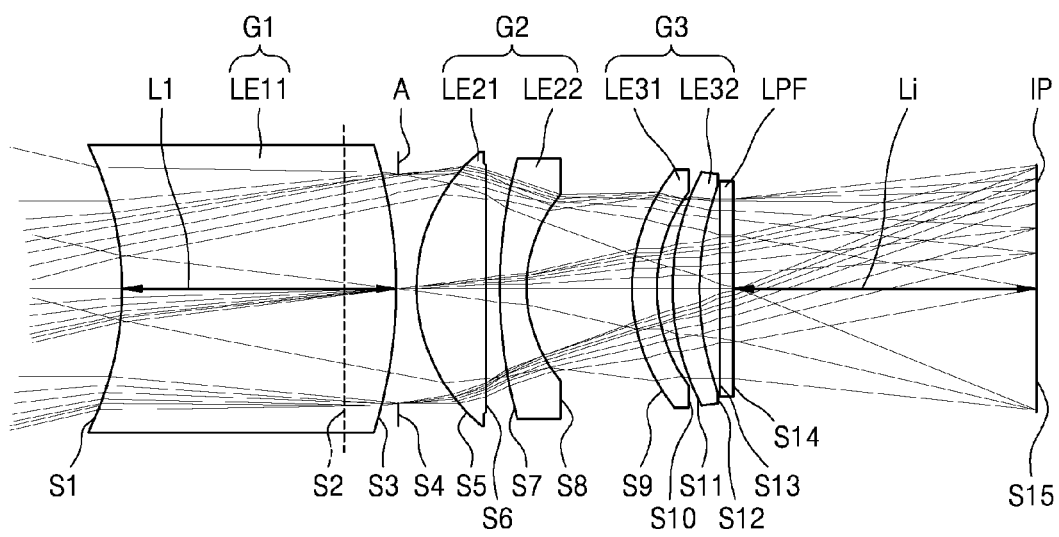
FIG. 2 is a cross-sectional view of a lens equivalent to the thin telephoto lens illustrated in FIG. 1.

Referring to FIG. 2, an optical path length along the central axis within the first lens element LE11 of the first lens group G1 is referred to as L1, and an optical path length from the low-pass filter LPF which is the last optical element of the thin telephoto lens 100 to the image plane IP is referred to as Li. When the low-pass filter LPF is placed immediately in front of the image plane IP to contact a surface of the image sensor package, Li may be an optical path length from the fifth lens element LE32 to the low-pass filter LPF. The optical path lengths L1 and Li are optical lengths which are not physical lengths and are calculated in consideration of refractive indices of materials included on the optical paths. For example, the optical path length L1 may be a value obtained by multiplying a physical distance between an object side lens surface S1 and an image side lens surface S3 of the first lens element LE11 along an optical axis OX by a refractive index of a material of the first lens element LE11. The optical path length Li may be a value obtained by multiplying a physical distance from the low-pass filter LPF to the image plane IP along the optical axis OX by a refractive index of air.

In order to minimize a volume of the thin telephoto lens 100, the optical path lengths L1 and Li may satisfy the following Formula 1.

$$1.3 \leq L1/Li \quad \text{(Formula 1)}$$

If L1/Li is smaller than 1.3, the optical path length Li is increased so that the entire length of the thin telephoto lens 100 is increased. Thus, in order to minimize a volume of the thin telephoto lens 100 while providing a bent optical path, it may be advantageous when Formula 1 is satisfied.

In addition, the thin telephoto lens 100 having a bent structure is formed when the optical path length L1 within the first lens element LE11 along the central axis is greater than or equal to a smallest effective aperture of the first lens element LE11. That is, a smallest effective aperture D1_s of the first lens element LE11 may satisfy the following Formula 2.

$$L1/D1\_s \geq 1 \quad \text{(Formula 2)}$$

After designing the first lens element LE11 that satisfies the above formulae, the first lens element LE11 having the shape of the prism P1 as illustrated in FIG. 1 may be formed. Also, by bending the optical path one more time by placing the mirror M1 between the fifth lens element LE32 and the image plane IP, the thickness T of the thin telephoto lens 100 may correspond to a distance from the object side lens surface S1 of the first lens element LE11 to the image plane IP along a direction perpendicular to the main axis OX2.

In addition, when forming the thin telephoto lens 100 having a bent structure as described above, a total length TTL of the thin telephoto lens 100, which is a distance between an object side lens surface of the first lens element LE11 and the image plane IP along a direction of the axes OX1 and OX2, is to be greater than an effective focal length EFL thereof in order to bend an optical path. However, there is no need to design an excessively large total length TTL of the thin telephoto lens 100 in a fixed focus lens which is not a zoom lens. Thus, a relationship between the total length TTL and the effective focal length EFL of the thin telephoto lens 100 may satisfy the following Formula 3.

$$1 < TTL/EFL \leq 2 \quad \text{(Formula 3)}$$

As described above, as the thin telephoto lens 100 has a structure in which an optical path is bent, the thin telephoto lens 100 may have a long focal length, and may have a small enough thickness to be used in a mobile device at the same time. Also, the thin telephoto lens 100 has a relatively small F-number of about 2 to about 5, and thus may provide bright images.

Exemplary Embodiment 1

The thin telephoto lens 100 having the structure illustrated in FIG. 1 is manufactured as Exemplary Embodiment 1. Table 1 below shows detailed optical data of optical elements of the thin telephoto lens 100 according to Exemplary Embodiment 1. In Table 1, a surface '0' denotes an object at an infinite range. In addition, a surface '2' denotes a virtual plane indicating an edge of the prism P1 that is close to the image side lens surface S3 in the first lens element LE11. The other surface numbers shown in Table 1 are identical to lens surface numbers illustrated in FIG. 2.

TABLE 1

| Surface | Surface Type | Radius | Thickness | Material | |
|---|---|---|---|---|---|
| 0 | Sphere | 1.00E+18 | 6.31E+13 | | Refract |
| 1 | Asphere | −7.58 | 2.29 | 531198.5649 | Refract |
| 2 | Sphere | 1.00E+18 | 4.6 | 531198.5649 | Refract |
| 3 | Asphere | −9.982 | 0.1 | | Refract |
| 4 | Stop | 1.00E+18 | 0.43 | | Refract |
| 5 | Asphere | 4.32 | 1.9101642 | 531198.5649 | Refract |
| 6 | Asphere | −63.705 | 0.3338034 | | Refract |
| 7 | Asphere | 13.846 | 0.45 | 635500.2389 | Refract |
| 8 | Asphere | 4.046 | 2.424819 | | Refract |
| 9 | Asphere | 4.173 | 0.65 | 635500.2389 | Refract |
| 10 | Asphere | 3.733 | 0.4542025 | | Refract |
| 11 | Asphere | 5.393 | 0.65 | 635500.2389 | Refract |
| 12 | Asphere | 6.3442 | 0.707011 | | Refract |
| 13 | Sphere | 1.00E+18 | 0.3 | BK7_SCHOTT | Refract |
| 14 | Sphere | 1.00E+18 | 7.7000013 | | Refract |
| 15 | Sphere | 1.00E+18 | 0 | | Refract |

Meanwhile, all surfaces of the first through fifth lens elements LE11, LE21, LE22, LE31, and LE32 are aspherical. Table 2 below shows aspherical coefficients with respect to the aspherical surfaces of the first through fifth lens elements LE11, LE21, LE22, LE31, and LE32 of the thin telephoto lens 100 according to Exemplary Embodiment 1. Here, the aspherical coefficients may satisfy Expression 1 below.

$$Z(r) = \frac{cr^2}{1 + \sqrt{1-(1+k)c^2 r^2}} + Ar^4 + Br^6 + Cr^8 + Dr^{10} + Er^{12} + Fr^{14} + Gr^{16} + Hr^{18} + Jr^{20} \quad \text{[Expression 1]}$$

In Expression 1, r denotes a location measured from an optical axis in a radial direction of a lens, c denotes a curvature (the reciprocal of a radius of curvature), k denotes a conic constant, and A, B, C, and D denote respective coefficients.

TABLE 2

| Surface No. | Radius | K | A | B | C | D |
|---|---|---|---|---|---|---|
| 1 | −7.58 | −0.84856318 | −0.00000505 | −0.00000066 | | |
| 3 | −9.982 | 0.62626452 | −0.00014345 | −0.00000286 | | |
| 5 | 4.32 | −0.94896074 | −0.00113797 | −0.00003332 | | |
| 6 | −63.705 | 0.00000000 | −0.00107916 | 0.00003565 | | |
| 7 | 13.846 | 1.00000000 | 0.00010397 | −0.00012709 | 0.00000701 | |
| 8 | 4.046 | 0.00000000 | 0.00009202 | −0.00021153 | −0.00000620 | |
| 9 | 4.173 | −0.94171145 | 0.00089598 | 0.00000514 | −0.00003959 | 0.00000090 |
| 10 | 3.733 | 0.23161461 | 0.00475776 | 0.00019843 | −0.00006138 | 0.00000073 |
| 11 | 5.393 | 0.00000000 | −0.00147594 | 0.00017502 | | |
| 12 | 6.3442 | −0.11632744 | −0.00302308 | 0.00005959 | 0.00003173 | |

A diameter of an aperture stop A of the thin telephoto lens 100 according to Exemplary Embodiment 1 is 5.78 mm, L1=6.89 mm, L1/Li=1.31, L1/D1_s=1.15, and TTL/EFL=1.8. In addition, a focal length of the thin telephoto lens 100 is 12.6 mm (equivalent to about 93 mm in a 35 mm film format), an F-number thereof is 2.86, and a 1/3.06-inch image sensor is used. The first through fifth lens elements LE11, LE21, LE22, LE31, and LE32 sequentially have negative, positive, negative, negative, and positive refractive powers.

Figure 3:
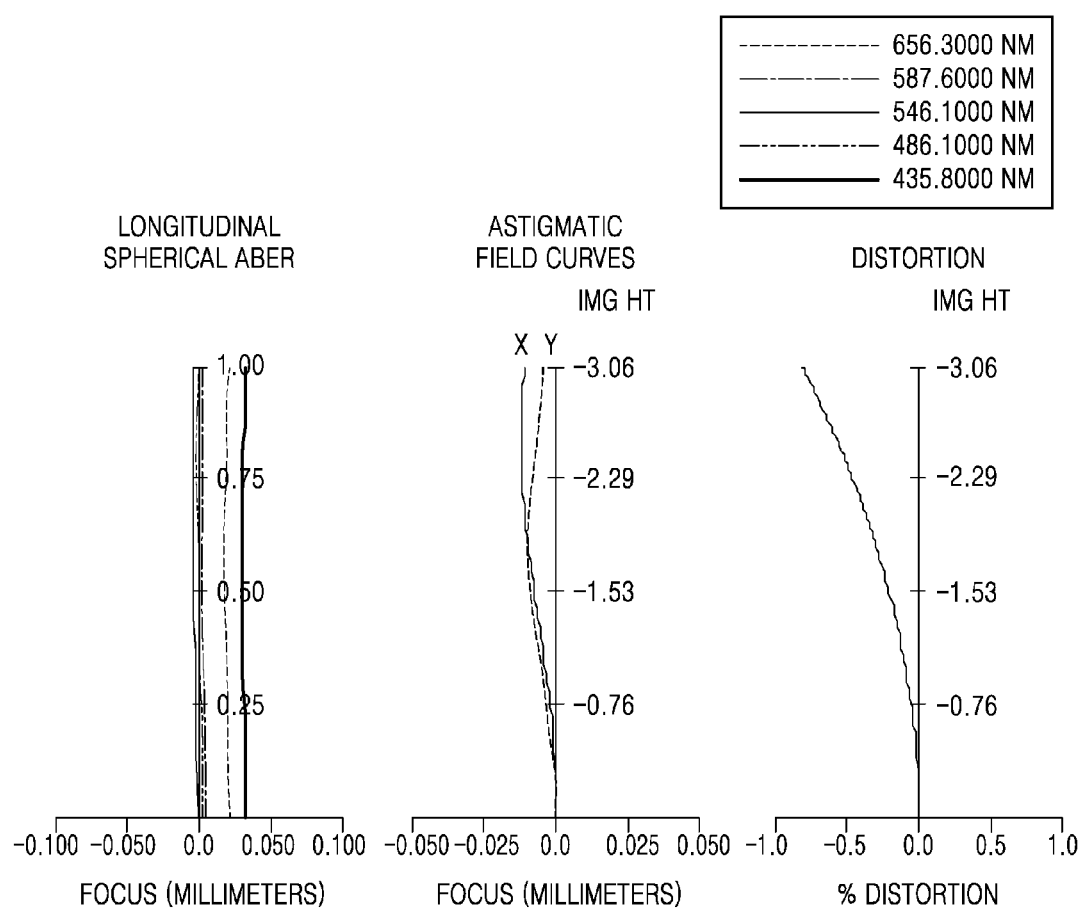
FIGS. 3 through 5 illustrate aberration diagrams of the thin telephoto lens illustrated in FIG. 1.
Figure 4:
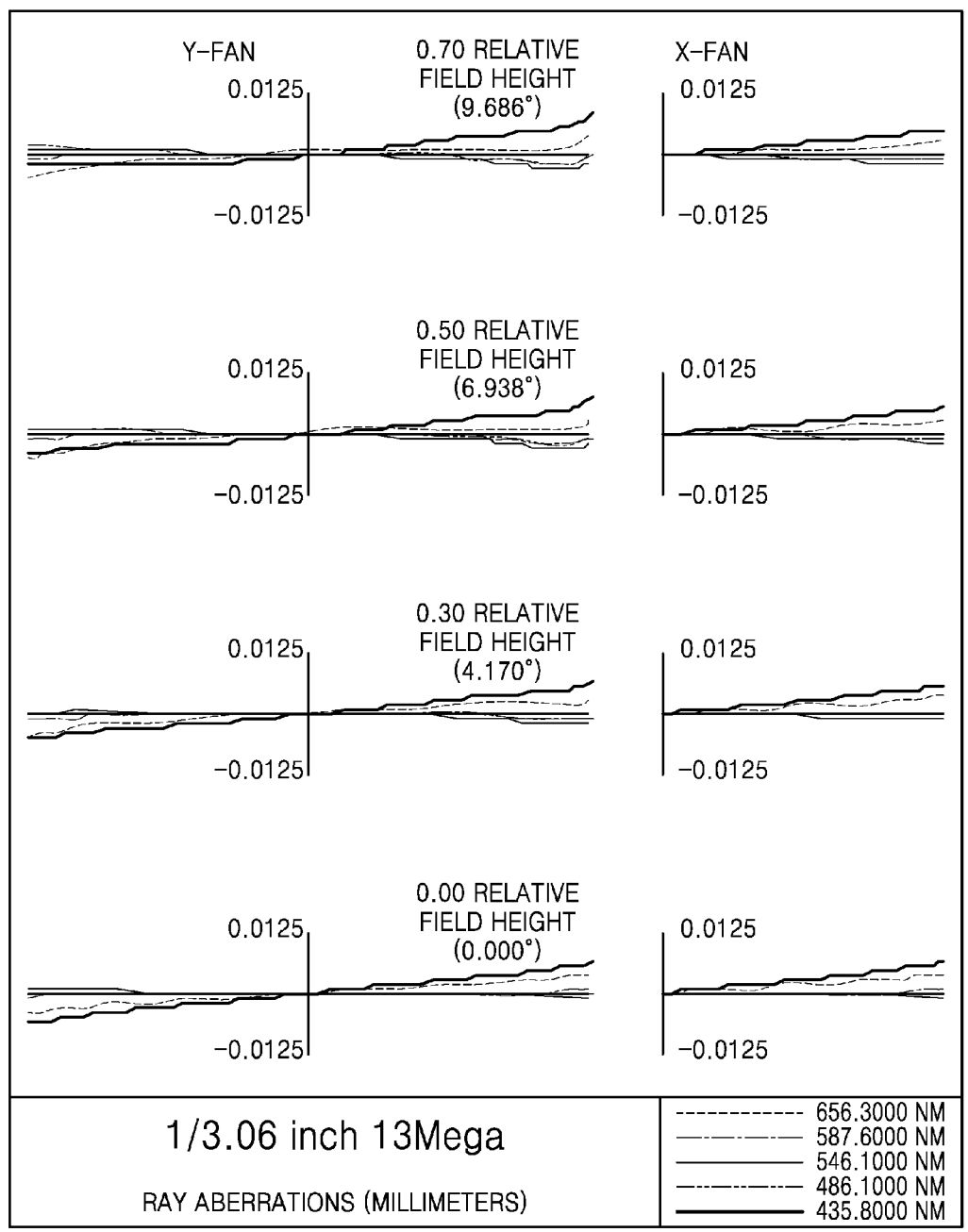
Figure 5:
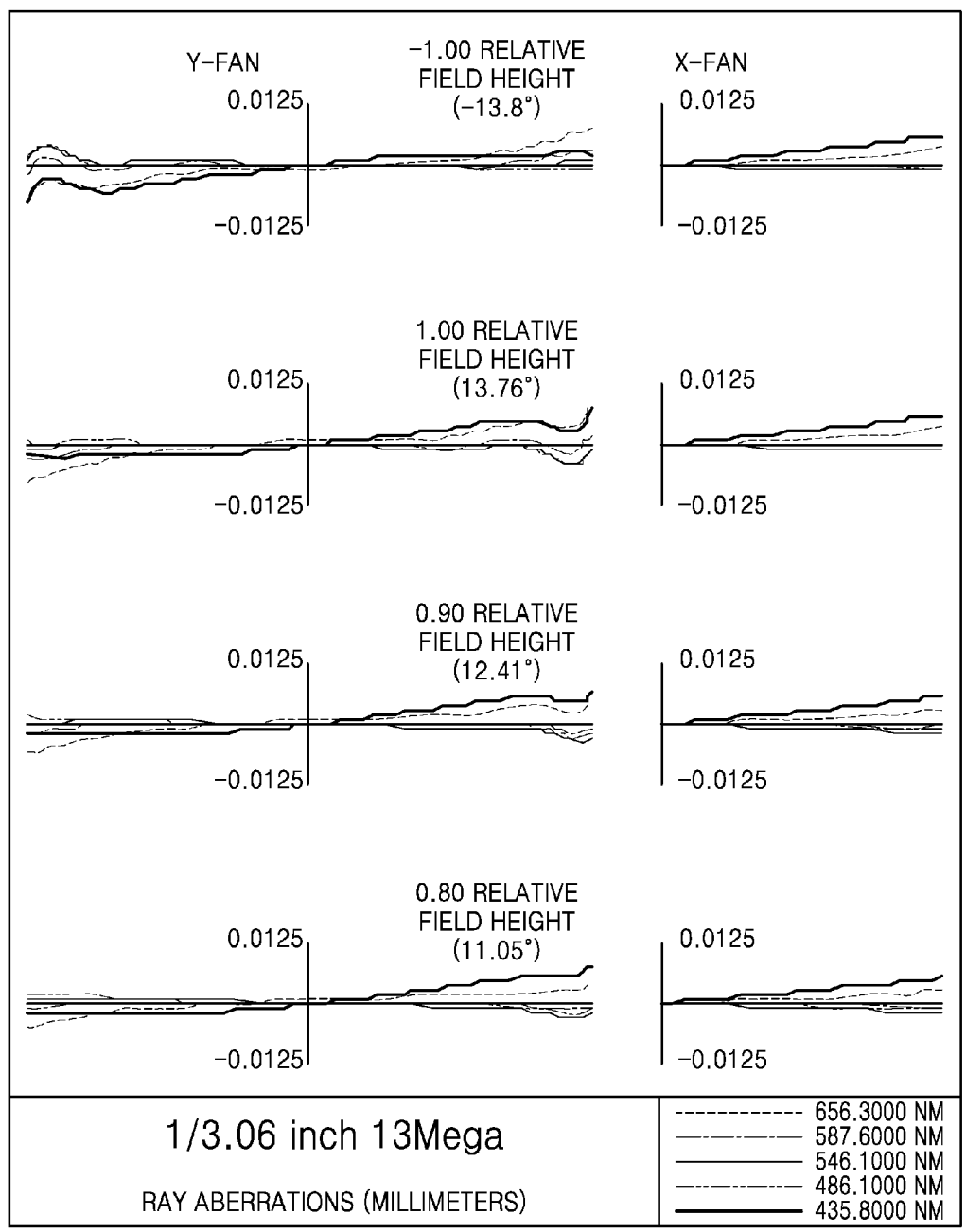

Meanwhile, FIGS. 3 through 5 illustrate aberration diagrams showing aberration performance of the thin telephoto lens 100 illustrated in FIG. 1 according to Exemplary Embodiment 1. For example, FIG. 3 sequentially shows spherical aberrations, astigmatism, and distortion aberrations from the left to the right. FIGS. 4 and 5 illustrate diagrams of horizontal aberrations.

Exemplary Embodiment 2

Figure 6:
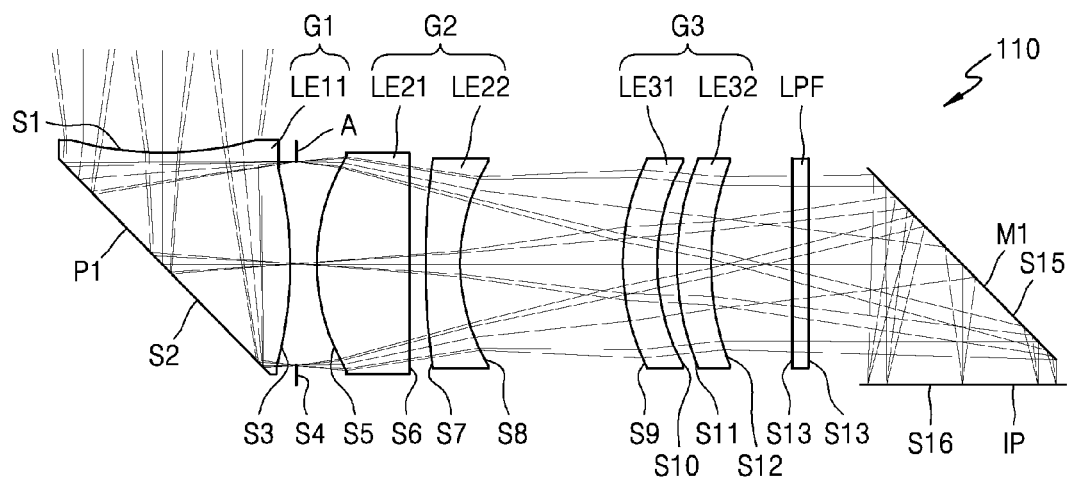
FIG. 6 is a cross-sectional view of a thin telephoto lens according to another exemplary embodiment.
Figure 7A:
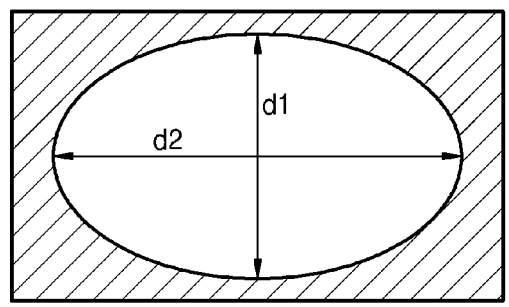
FIG. 7A illustrates an aperture stop of the thin telephoto lens illustrated in FIG. 6 according to an exemplary embodiment.
Figure 7B:
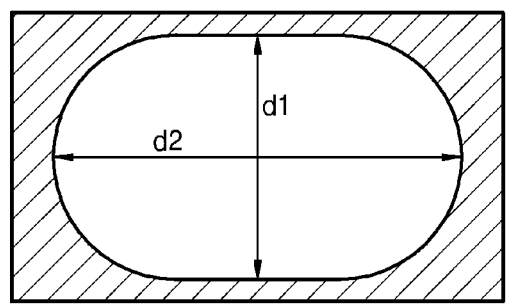
FIG. 7B illustrates an aperture stop of the thin telephoto lens illustrated in FIG. 6 according to another exemplary embodiment.

FIG. 6 is a cross-sectional view of a thin telephoto lens 110 according to an exemplary embodiment, i.e., Exemplary Embodiment 2. According to Exemplary Embodiment 2, in order to manufacture a lens module having a thickness of 6 mm or less and to reduce an effective F-number of the thin telephoto lens 110, an aperture stop A may have a different shape instead of a typical circular shape. For example, as illustrated in FIG. 7A, the aperture stop A may have an oval shape having a size in a Y-axis direction different from a size in an X-axis direction. In this case, in order to reduce a thickness of the thin telephoto lens 110, a vertical diameter d1 of the aperture stop A may be smaller than a horizontal diameter d2 thereof. Alternatively, as illustrated in FIG. 7B, the aperture stop A may have a shape formed by cutting out upper and lower portions of a circle. FIG. 7B illustrates the aperture stop A having a shape formed by cutting both upper and lower portions of a circle. However, only one of upper and lower portions of a circle may be cut. In addition to the shapes illustrated in FIGS. 7A and 7B, an aperture stop A having other shapes with a size smaller in a Y-axis direction than in an X-axis direction may be used.

Figure 8A:
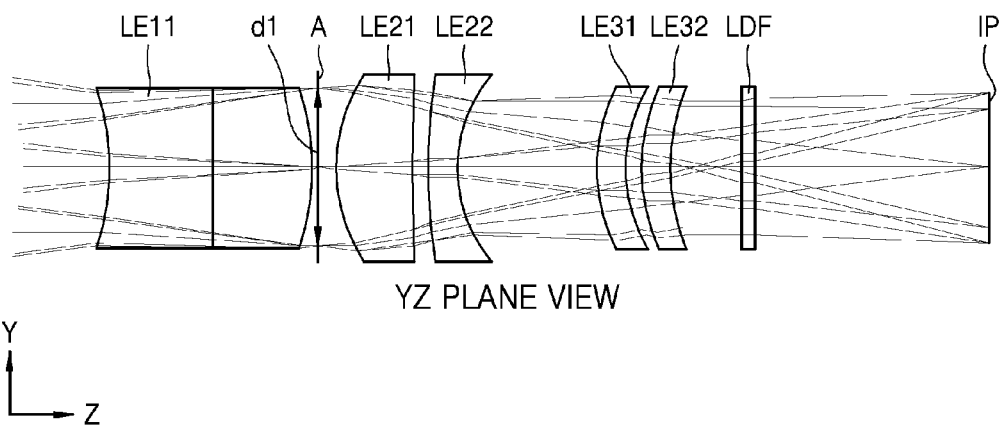
FIG. 8A is a cross-sectional view of a lens equivalent to the thin telephoto lens illustrated in FIG. 6 along a YZ plane.
Figure 8B:
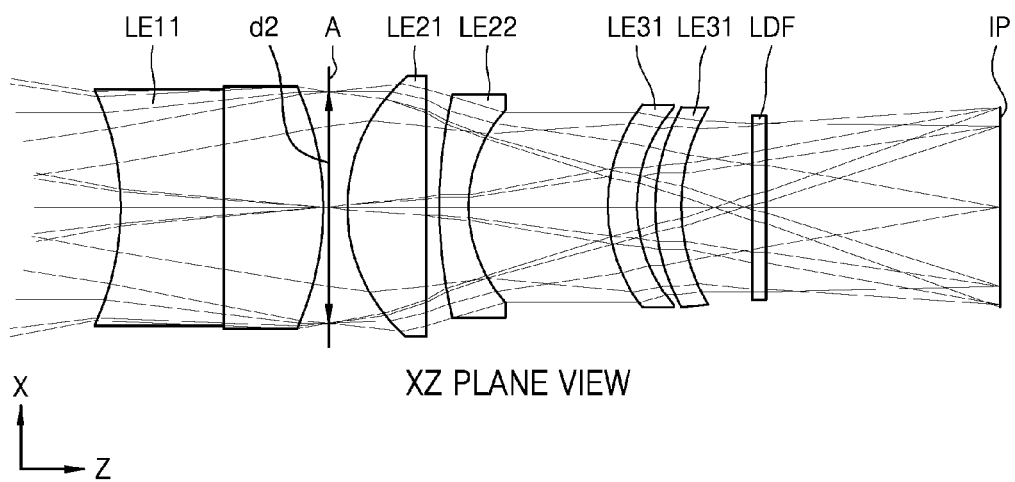
FIG. 8B is a cross-sectional view of a lens equivalent to the thin telephoto lens illustrated in FIG. 6 along a XZ plane.

Not only the aperture stop A but also other optical elements of the thin telephoto lens 110 may have a shape formed by cutting out upper and lower portions of a circle. For example, FIG. 8A is a cross-sectional view of a lens equivalent to the thin telephoto lens 110 illustrated in FIG. 6 along a YZ plane, and FIG. 8B is a cross-sectional view of a lens equivalent to the thin telephoto lens 110 illustrated in FIG. 6 along a XZ plane. The YZ plane is a vertical plane which is in a thickness direction, and the XZ plane is a horizontal plane which is in a width direction. FIGS. 8A and 8B illustrate, for convenience, that an optical path is not bent in the first lens group G1, and an optical path is not bent between the third lens group G3 and the image plane IP, and the other features illustrated in FIGS. 8A and 8B are optically identical to those of the thin telephoto lens 110 of FIG. 6. Referring to FIGS. 8A and 8B, sizes of the aperture stop A and the optical elements (the first through fifth lens elements LE11, LE21, LE22, LE31, and LE32 and the low-pass filter LPF) on the YZ plane may be smaller than sizes of the aperture stop A and the optical elements (the first through fifth lens elements LE11, LE21, LE22, LE31, and LE32 and the low-pass filter LPF) on the XZ plane. Thus, the thickness of the thin telephoto lens 110 may be further reduced.

Table 3 below shows detailed optical data of optical elements of the thin telephoto lens 110 illustrated in FIG. 6. In Table 3, surfaces '2' and '15' are reflection surfaces of the prism P1 and the mirror M1. The other surface numbers of Table 3 are identical to lens surface numbers illustrated in FIG. 6.

TABLE 6

| Surface | Surface Type | Radius | Thickness | Material | |
|---|---|---|---|---|---|
| 0 | Sphere | 1.00E+18 | 6.31E+13 | | Refract |
| 1 | Asphere | −6.432 | 2.1 | 531198.5649 | Refract |
| 2 | Sphere | 1.00E+18 | 2.5 | 531198.5649 | Reflect |
| 3 | Asphere | 7.112 | 0.1 | | Refract |
| 4 | Stop | 1.00E+18 | 0.43 | | Refract |
| 5 | Asphere | −4.283 | 1.77 | 531198.5649 | Refract |
| 6 | Asphere | 295.050 | 0.31 | | Refract |
| 7 | Asphere | −14.712 | 0.68 | 635500.2389 | Refract |
| 8 | Asphere | −4.005 | 3.15556 | | Refract |
| 9 | Asphere | −4.426 | 0.65 | 635500.2389 | Refract |
| 10 | Asphere | −3.709 | 0.4 | | Refract |
| 11 | Asphere | −5.028 | 0.65 | 635500.2389 | Refract |
| 12 | Asphere | −6.468 | 1.587733 | | Refract |
| 13 | Sphere | 1.00E+18 | 0.3 | BK7_SCHOTT | Refract |
| 14 | Sphere | 1.00E+18 | 3 | | Refract |
| 15 | Sphere | 1.00E+18 | 2.3413149 | | Reflect |
| 16 | Sphere | 1.00E+18 | 0 | | Refract |

In addition, all surfaces of the first through fifth lens elements LE11, LE21, LE22, LE31, and LE32 are aspherical. Table 4 below shows aspherical coefficients with respect to the aspherical surfaces of the first through fifth lens elements LE11, LE21, LE22, LE31, and LE32 of the thin telephoto lens 110 according to Exemplary Embodiment 2.

TABLE 4

| Surface No. | Radius | K | A | B | C | D |
|---|---|---|---|---|---|---|
| 1 | −6.432 | −0.89113404 | 0.00007069 | 0.00000424 | | |
| 3 | 7.112 | −0.79549563 | −0.00020673 | −0.00000284 | | |
| 6 | −4.283 | −0.92448047 | −0.00118012 | −0.00003531 | | |
| 7 | 295.050 | 0.00000000 | −0.00088850 | 0.00003721 | | |
| 8 | −14.712 | 1.09781242 | 0.00008652 | −0.00011752 | 0.00000651 | |
| 9 | −4.005 | 0.00000000 | 0.00045241 | −0.00023201 | −0.00000698 | |
| 10 | −4.426 | −0.65092665 | 0.00070029 | −0.00008212 | −0.00005098 | 0.00000209 |
| 11 | −3.709 | 0.28037128 | 0.00555161 | 0.00007757 | −0.00009126 | 0.00000238 |
| 12 | −5.028 | 0.00000000 | −0.00057706 | 0.00014269 | | |
| 13 | −6.468 | 1.01359407 | −0.00344091 | 0.00002883 | 0.00004855 | |

Diameters of the aperture stop of the thin telephoto lens 110 according to Exemplary Embodiment 2 are respectively 3.88 mm and 5.78 mm in a Y-axis direction and an X-axis direction, L1/Li=1.36, L1/D1_s=1.12, and TTL/EFL=1.83. In addition, a focal length of the thin telephoto lens 110 is 12.6 mm (equivalent to about 93 mm in a 35 mm film format), an F-number thereof is 3.1, and a 1/3.06-inch image sensor is used. Also, a thickness of the thin telephoto lens 110 is about 4.66 mm in the Y-axis direction. The first through fifth lens elements LE11, LE21, LE22, LE31, and LE32 sequentially have negative, positive, negative, negative, and positive refractive powers.

Figure 9:
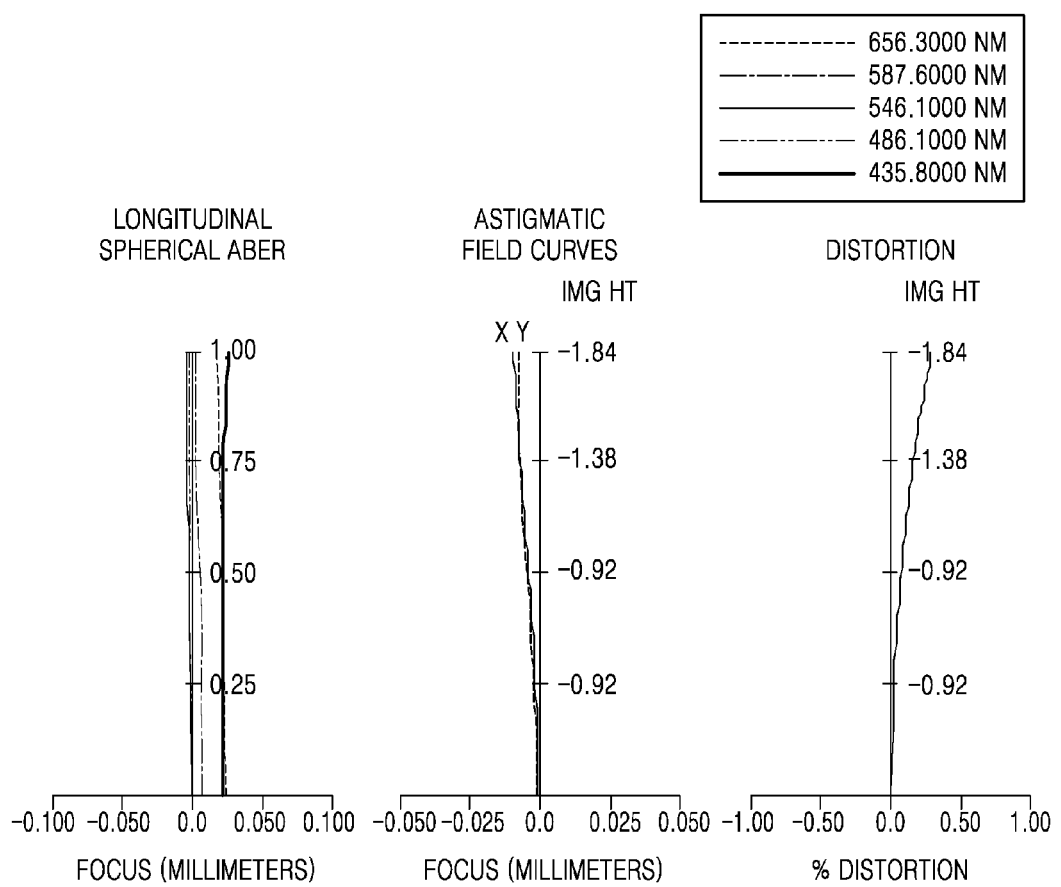
FIGS. 9 through 11 are aberration diagrams of the thin telephoto lens illustrated in FIG. 6.
Figure 10:
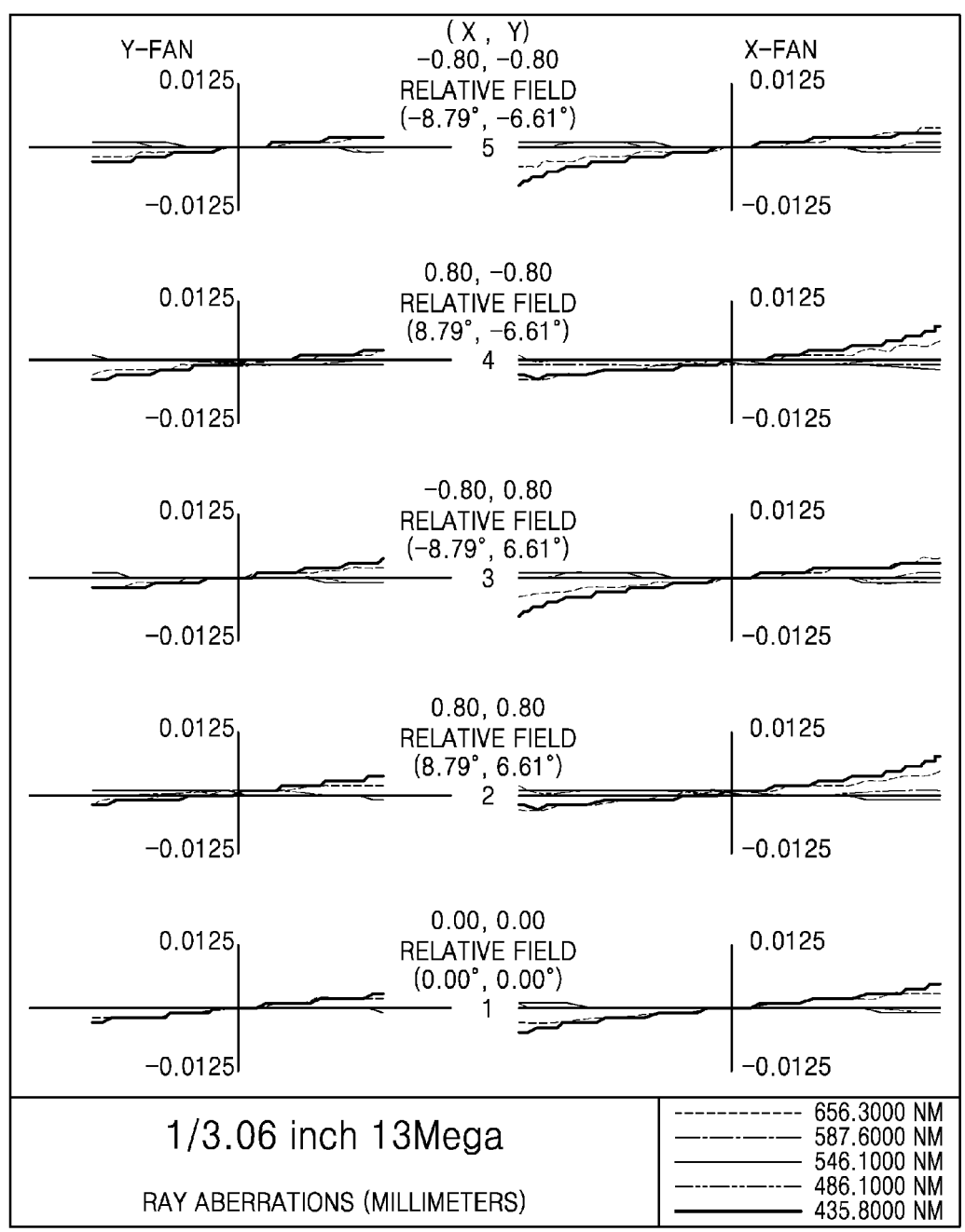
Figure 11:
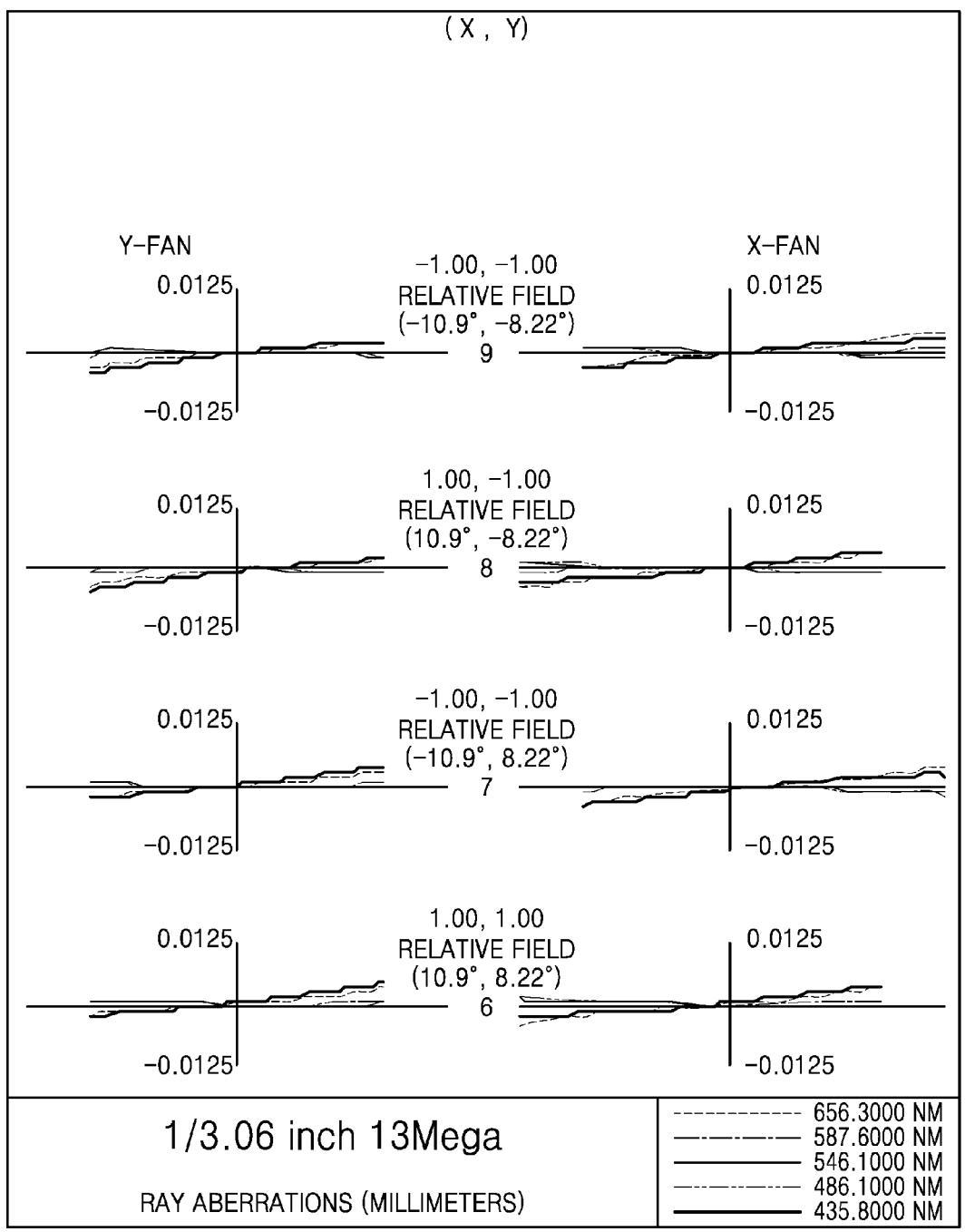

Meanwhile, FIGS. 9 through 11 illustrate aberration diagrams showing aberration performance of the thin telephoto lens 110 illustrated in FIG. 6 according to Exemplary Embodiment 2. For example, FIG. 9 sequentially shows spherical aberrations, astigmatism, and distortion aberrations from the left to the right. FIGS. 10 and 11 illustrate diagrams of horizontal aberrations.

Figure 12:
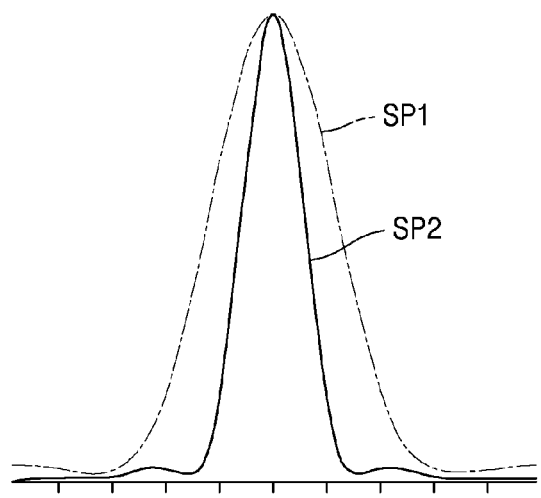
FIG. 12 is an exemplary graph of a light distribution of oval spots formed by the thin telephoto lens illustrated in FIG. 6.

Meanwhile, when the diameter of the aperture stop A is increased in a horizontal direction in order to maintain an effective F-number of the thin telephoto lens 110 while reducing the diameter of the aperture stop A in the thickness direction as described above, spots formed on a focus plane due to the thin telephoto lens 110 also have an oval shape. Thus, a spot size in a tangential direction is different from a spot size in a sagittal direction. For example, FIG. 12 is an exemplary graph showing a light distribution of oval spots formed by the thin telephoto lens 110 illustrated in FIG. 6. In the graph of FIG. 12, SP1 denotes a light distribution of spots in a vertical direction, and SP2 denotes a light distribution of spots in a horizontal direction. As illustrated in FIG. 12, a light distribution of spots is narrowed in a horizontal direction. That is, spots may be further spread in a vertical direction along which the diameter of the aperture stop A is reduced.

The shape of the spots may also affect performance of a modulation transfer function (MTF). As a result, clarity of a final image in a tangential direction may be different from that in a sagittal direction. In other words, an image quality in a horizontal direction and an image quality in a vertical direction may be different. If a difference between the image quality in the horizontal direction and the image quality in the vertical direction is too large, it may be difficult to compensate for an image quality via image processing. Thus, in order to reduce the difference between the image qualities in the horizontal direction and the vertical direction so as to maintain the difference within a compensable degree, the diameter of the aperture stop A in a short axis (i.e., a minor axis of an oval) direction (that is, the diameter thereof in a vertical direction) may be limited not to be too small.

For example, if a pixel pitch of an image sensor is very small as about 1.12 um or about 1.4 um, and an F-number is about 6, a MTF value is theoretically about 15%. If the MTF value is less than 15%, a noise portion is also increased during signal compensation, and thus compensation may be difficult. Thus, it may be advantageous to maintain an F-number that allows a MTF value of 15% or greater so as to limit the diameter of the aperture stop A in the short axis direction as below.

$$Ra \geq f/6 \qquad \text{(Formula 4)}$$

In Formula 4, Ra denotes the diameter of the aperture stop A in the short axis direction, and f denotes a focal length of the thin telephoto lens 110. When the diameter of the aperture stop A in the short axis direction/the minor axis direction satisfies Formula 4, a MTF value increases to be greater than 15%, and thus, a difference in image qualities in a horizontal direction and a vertical direction may be compensated via appropriate image processing.

Figure 13:
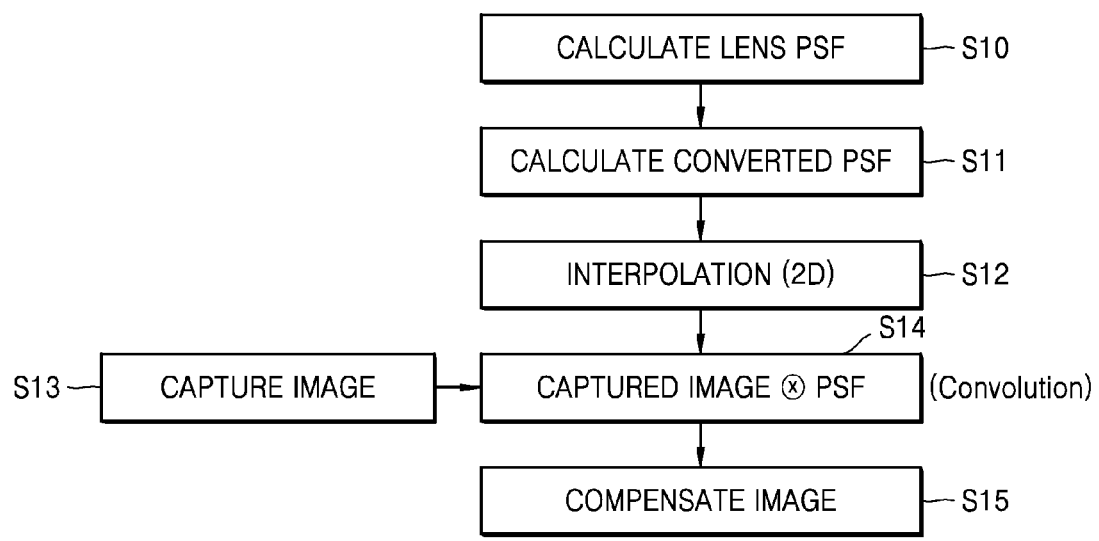
FIG. 13 is a flowchart of a method of processing images to compensate for a difference in image qualities depending on directions when spots are oval, according to an exemplary embodiment.

For example, FIG. 13 is a flowchart of a method of image processing to compensate for a difference in image qualities depending on directions when spots have an oval shape, according to an exemplary embodiment. Referring to FIG. 13, because the shape of the aperture stop A of the thin telephoto lens 110 is already known, first, a point spread function (PSF) may be calculated based on the shape of the aperture stop A. A PSF value may also be theoretically calculated based on values regarding the shape of the aperture stop A or based on an image obtained by photographing an object in the form of a point light source. Because a PSF value has to be calculated with respect to the entire image, calculation may be performed by selecting some points from a central portion to a peripheral portion of the image. The more are selected points, a more accurate PSF value may be obtained, but an amount of calculation is increased accordingly. Thus, the number of points may be set by considering an amount of calculation that may be actually conducted.

As described with reference to FIG. 12, spots may be further spread in the short/minor axis direction of the aperture stop A, that is, in the vertical direction. Thus, because the PSF value is increased in the vertical direction, an image may be deteriorated. Accordingly, a PSF value converted with respect to the vertical direction may be calculated by considering a PSF value in a long axis direction of the aperture stop A, that is, in a horizontal direction (S11).

After calculating a PSF value with respect to all selected points and converting the PSF value, a PSF value with respect to locations between the selected points may be calculated via, for example, an interpolation method (S12). Accordingly, PSF values with respect to all two-dimensional areas may be calculated. Next, by converting the PSF values into functions, the PSF values may be stored in a memory (not shown) of an image pickup apparatus. Operations S10 through S12 described above may be previously conducted during the manufacture of the thin telephoto lens 110 and an image pickup apparatus including the thin telephoto lens 110.

Next, when a user captures an image by using the image pickup apparatus including the thin telephoto lens 110 (S13), convolution calculation may be conducted on an actually captured image by using the PSF values in the forms of functions, stored in the memory of the image pickup apparatus (S14). In this manner, deterioration of an image due to the aperture stop A having different diameters in a horizontal direction and a vertical direction may be compensated so as to obtain a compensated image (S15).

In sum, according to the image processing method described above, image deterioration of an actually captured image in a vertical direction is compensated by referring to a difference between a PSF value of the thin telephoto lens 110 in a horizontal direction and a PSF value thereof in a vertical direction. In addition to using of a software-type image processing method as described above, an image may also be compensated by using an image clarity improving filter having a directivity. For example, a filter (not shown) that increases clarity in a vertical direction may be disposed on a front surface of an image sensor.

Exemplary Embodiment 3

Figure 14:
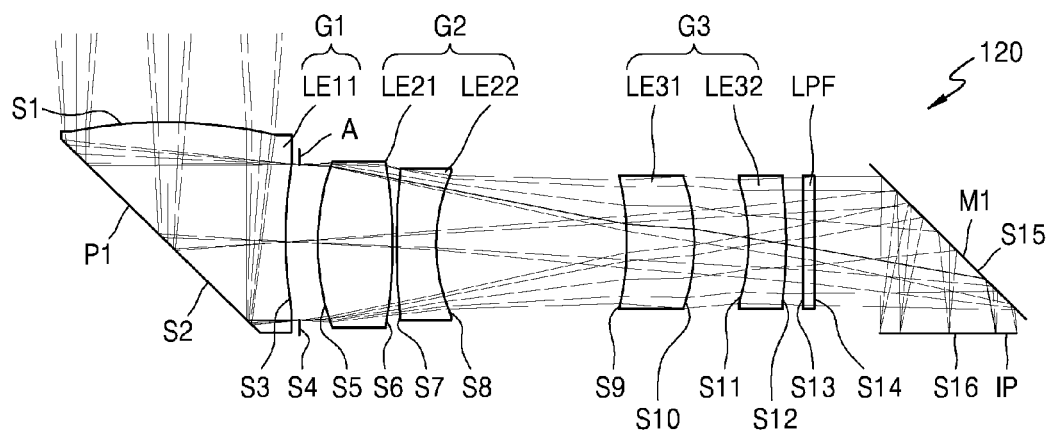
FIG. 14 is a cross-sectional view of a thin telephoto lens according to another exemplary embodiment.

FIG. 14 is a cross-sectional view of a thin telephoto lens 120 according to an exemplary embodiment, i.e., Exemplary Embodiment 3. The thin telephoto lens 120 illustrated in FIG. 14 has a longer focal length than the thin telephoto lens 100 of FIG. 1 or the thin telephoto lens 110 of FIG. 6. As described above, when a focal length of the thin telephoto lens 120 is equivalent to a focal length of about 120 mm or greater in a 35 mm film format, an incidence angle is small and thus it may be advantageous to set a large refraction angle. Accordingly, an object side lens surface S1 of the first lens element LE11 of the first lens group G1 of the thin telephoto lens 120 may be convex.

Table 5 below shows detailed optical data of optical elements of the thin telephoto lens 120 illustrated in FIG. 14. In Table 5, surfaces '2' and '15' are reflection surfaces of the prism P1 and the mirror M1. The other surface numbers of Table 5 are identical to lens surface numbers illustrated in FIG. 14.

TABLE 5

| Surface | Surface Type | Radius | Thickness | Material | |
|---|---|---|---|---|---|
| 0 | Sphere | 1.00E+18 | 6.31E+13 | | Refract |
| 1 | Asphere | 14.279 | 3.3 | 531198.5649 | Refract |
| 2 | Sphere | 1.00E+18 | 3.2 | 531198.5649 | Reflect |
| 3 | Asphere | −12.735 | 0.38 | | Refract |
| 4 | Stop | 1.00E+18 | 0.5 | | Refract |
| 5 | Asphere | −7.023 | 2 | 531198.5649 | Refract |
| 6 | Asphere | 12.421 | 0.1 | | Refract |
| 7 | Asphere | −13.061 | 1.1 | 635500.2389 | Refract |
| 8 | Asphere | −4.906 | 5.62701 | | Refract |
| 9 | Asphere | 8.502 | 1.79 | 635500.2389 | Refract |
| 10 | Asphere | 5.958 | 1.00299 | | Refract |
| 11 | Asphere | 7.331 | 1 | 531198.5649 | Refract |
| 12 | Asphere | 68.203 | 0.5 | | Refract |
| 13 | Sphere | 1.00E+18 | 0.3 | BK7_SCHOTT | Refract |
| 14 | Sphere | 1.00E+18 | 3.6 | | Refract |
| 15 | Sphere | 1.00E+18 | 2.5000386 | | Reflect |
| 16 | Sphere | 1.00E+18 | 0 | | Refract |

In addition, all surfaces of the first through fifth lens elements LE11, LE21, LE22, LE31, and LE32 are aspherical. Table 6 below shows aspherical coefficients with respect to the aspherical surfaces of the first through fifth lens elements LE11, LE21, LE22, LE31, and LE32 of the thin telephoto lens 120 according to Exemplary embodiment 3.

TABLE 6

| Surface No. | Radius | K | A | B | C | D | E |
|---|---|---|---|---|---|---|---|
| 2 | 14.279 | −0.43696243 | −0.00019101 | −0.00000281 | 0.00000011 | −0.000000007 | 0.000000000 |
| 4 | −12.735 | −0.45486536 | 0.00049135 | 0.00001468 | −0.00000238 | 0.00000022 | −0.000000008 |
| 6 | −7.023 | −1.62262942 | −0.00114110 | 0.00004471 | −0.00000892 | 0.00000083 | −0.00000003 |
| 7 | 12.421 | 6.59907297 | −0.00188474 | 0.00007304 | −0.00000738 | 0.00000038 | −0.00000001 |
| 8 | −13.061 | 0.00000000 | 0.00412100 | −0.00031448 | 0.00002776 | −0.00000229 | 0.00000010 |
| 9 | −4.906 | 0.00000000 | 0.00606256 | −0.00052625 | 0.00005327 | −0.00000481 | 0.00000024 |
| 10 | 8.502 | 0.00000000 | 0.00137810 | 0.00014497 | −0.00000722 | −0.00000087 | 0.00000010 |
| 11 | 5.958 | 0.00000000 | 0.00016673 | 0.00015804 | −0.00001245 | −0.00000069 | 0.00000010 |
| 12 | 7.331 | 0.00000000 | 0.00541929 | −0.00010622 | 0.00001392 | −0.00000609 | 0.00000063 |
| 13 | 68.203 | 0.00000000 | 0.00611957 | −0.00032183 | 0.00002574 | −0.00000265 | 0.00000017 |

Diameters of an aperture stop of the thin telephoto lens 120 according to Exemplary Embodiment 3 are respectively 4.3 mm and 6.2 mm in a Y-axis direction and an X-axis direction, $L1/Li=1.63$, $L1/D1\_s=1.49$, and $TTL/EFL=1.067$. In addition, a focal length of the thin telephoto lens 120 is 25.2 mm (equivalent to about 186 mm in a 35 mm film format), an F-number thereof is 4.2, and a 1/3.06-inch image sensor is used. A thickness of the thin telephoto lens 120 is about 5.81 mm in the Y-axis direction. The first through fifth lens elements LE11, LE21, LE22, LE31, and LE32 sequentially have positive, positive, negative, positive, and negative refractive powers.

Figure 15:
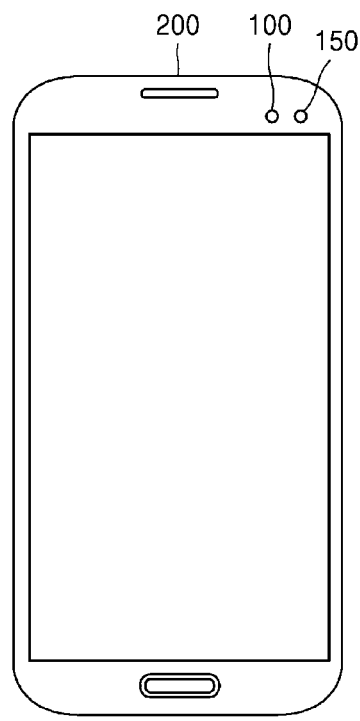
FIG. 15 is a plan view of an image pickup apparatus according to an exemplary embodiment.

The thin telephoto lenses 100, 110, and 120 according to the above-described exemplary embodiments have a sufficiently small thickness, and thus may be used in an image pickup apparatus mounted in a mobile device such as a smartphone. For example, FIG. 15 is a plan view illustrating an image pickup apparatus 200 according to an exemplary embodiment. Referring to FIG. 15, the image pickup apparatus 200 may include one telephoto lens 100 and one wide-angle lens 150. While FIG. 15 illustrates that the image pickup apparatus 200 includes the telephoto lens 100 according to Exemplary Embodiment 1, the image pickup apparatus 200 may also include the telephoto lens 110 or 120 according to Exemplary Embodiment 2 or 3. Also, while only one telephoto lens 100 and one wide-angle lens 150 are illustrated in FIG. 15, the image pickup apparatus 200 may also include one or more telephoto lenses 100 and one or more wide-angle lenses 150.

The image pickup apparatus 200 may perform both wide-angle photographing and telephoto photographing by using the telephoto lens 100 and the wide-angle lens 150. In particular, the image pickup apparatus 200 may provide a digital zooming function with respect to an angle of view between a wide angle and a telephoto position. For example, an image of an intermediate angle of view may be generated by using, for example, an interpolation method, based on a wide-angle image of a broad angle of view, obtained by using the wide-angle lens 150, and a telephoto image of a narrow angle of view, obtained by using the telephoto lens 100. As an image of an intermediate angle of view is generated by using both a wide-angle image and a telephoto image, the image pickup apparatus 200 may provide a digital zooming function with an improved image quality compared to a digital zooming function according to the related art in which a single wide-angle image is simply expanded.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A telephoto lens comprising a first lens group, the first lens group comprising:
   a first lens element comprising:
      an object side lens surface facing an object side; and
      an image side lens surface facing an image side; and
   a prism configured to bend an optical path within the first lens element,
   wherein the first lens element and the prism are formed as a single body,
   wherein an inclined surface of the prism is provided between the object side lens surface and the image side lens surface, and
   wherein the following relationship is satisfied:

$1.3 \leq L1/Li$, where L1 corresponds to a length of an optical path from the object side lens surface to the image side lens surface of the first lens element along an optical axis of the first lens group and Li corresponds to a length of an optical path between an optical element provided closest to an image plane and the image plane along the optical axis.

2. The telephoto lens of claim 1, wherein the prism is configured to bend a first optical path entering through the object side lens surface to a second optical path exiting through the image side lens surface.

3. The telephoto lens of claim 2, wherein the first optical path extends in a substantially perpendicular direction from the second optical path.

4. The telephoto lens of claim 1, wherein the following relationship is satisfied:

$L1/D1\_s \geq 1$, where $D1\_s$ corresponds to a smallest effective aperture of the first lens element.

5. The telephoto lens of claim 1, wherein the following relationship is satisfied:

$1 < TTL/EFL \geq 2$, where TTL corresponds to a total length of the telephoto lens and EFL corresponds to an effective focal length.

6. The telephoto lens of claim 1, further comprising:
   a second lens group; and
   a third lens group, the second and the third lens groups sequentially disposed next to the first lens group in a direction from the object side to the image side,
   wherein the second lens group has a positive refractive power.

7. The telephoto lens of claim 6, wherein the second lens group comprises:
   a second lens element; and
   a third lens element, the second and the third lens elements sequentially disposed in the direction from the object side to the image side,
   wherein the second lens element has a positive refractive power and the third lens element has a negative refractive power.

8. The telephoto lens of claim 6, wherein the second lens group is configured to be displaced in a direction perpendicular to the optical axis so as to correct vibration of the telephoto lens.

9. The telephoto lens of claim 6, wherein the third lens group is configured to be displaced along the optical axis so as to perform a focusing function.

10. The telephoto lens of claim 6, wherein the third lens group comprises:
    a fourth lens element; and
    a fifth lens element, the fourth and the fifth lens elements sequentially disposed in the direction from the object side to the image side,
    wherein each of the fourth lens element and the fifth lens element comprises a meniscus lens having a convex surface facing the object side and a concave surface facing the image side.

11. The telephoto lens of claim 10, wherein the first lens element has a negative refractive power,
    wherein the fourth lens element has a negative refractive power,
    wherein the fifth lens element has a positive refractive power, and
    wherein the object side lens surface of the first lens element comprises a concave surface.

12. The telephoto lens of claim 11, wherein a focal length of the telephoto lens is equivalent to a focal length less than 120 mm in a 35 mm film format.

13. The telephoto lens of claim 6, wherein the third lens group comprises:
    a fourth lens element; and
    a fifth lens element, the fourth and the fifth lens elements sequentially disposed in the direction from the object side to the image side, wherein each of the fourth lens elements and the fifth lens element comprises a meniscus lens having a concave surface facing the object side and a convex surface facing the image side, wherein the first lens element has a positive refractive power, wherein the fourth lens element has a positive refractive power, wherein the fifth lens element has a negative refractive power, and wherein the object side lens surface of the first lens element comprises a convex surface.

14. The telephoto lens of claim 13, wherein a focal length of the telephoto lens is equivalent to a focal length greater than 120 mm in a 35 mm film format.

15. The telephoto lens of claim 10, further comprising a mirror between the fifth lens element and the image plane,
wherein the mirror bends the optical path between the optical element provided closest to the image plane and the image plane.

16. The telephoto lens of claim 10, further comprising a low-pass filter provided between the fifth lens element and the image plane, the low-pass filter configured to pass rays having a shorter wavelength than infrared rays and configured to block infrared rays.

17. The telephoto lens of claim 16, wherein the optical element provided closest to the image plane corresponds to the low-pass filter.

18. The telephoto lens of claim 10, further comprising a low-pass filter provided on the image plane, the low-pass filter configured to pass rays having a shorter wavelength than infrared rays and configured to block infrared rays, and
wherein the length Li corresponds to a length of an optical path between the fifth lens element and the low-pass filter.

19. The telephoto lens of claim 1, further comprising an aperture stop provided between the first lens group and a second lens group, the second lens group sequentially disposed next to the first lens group in a direction from the object side to the image side,
wherein the aperture stop has a first length extending in a first direction and a second length extending in a second direction perpendicular to the first direction of the telephoto lens, the first length being greater than the second length.

20. The telephoto lens of claim 19, wherein the aperture stop has an oval shape or a shape formed by cutting out upper or lower portions of a circle.

21. The telephoto lens of claim 20, wherein the following relationship is satisfied:

$Ra \geq f/6$, where Ra corresponds to a length of the aperture stop in the second direction and f corresponds to a focal length of the telephoto lens.

22. An image pickup apparatus comprising:
at least one wide-angle lens; and
at least one telephoto lens,
wherein the at least one telephoto lens comprises a first lens group comprising:
  a first lens element having:
    an object side lens surface facing an object side; and
    an image side lens surface facing an image side; and
  a prism configured to bend an optical path with the first lens element, wherein the first lens element and the prism are formed as a single body, wherein an inclined surface of the prism is provided between the object side lens surface and the image side lens surface, and wherein the following relationship is satisfied:

$1.3 \leq L1/Li$, where L1 corresponds to a length of an optical path from the object side lens surface to the image side lens surface of the first lens element along an optical axis of the first lens group and Li corresponds to a length of an optical path between an optical element provided closest to an image plane and the image plane along the optical axis.

23. The image pickup apparatus of claim 22, wherein the prism is configured to bend a first optical path entering through the object side lens surface to a second optical path exiting through the image side lens surface.

24. The image pickup apparatus of claim 23, wherein the first optical path extends in a substantially perpendicular direction from the second optical path.

25. The image pickup apparatus of claim 24, further comprising an aperture stop provided between the first lens group and a second lens group, the second lens group sequentially disposed next to the first lens group in a direction from the object side to the image side,
wherein the aperture stop has a first length extending in a first direction and a second length extending in a second direction perpendicular to the first direction of the telephoto lens, the first length being greater than the second length.

26. The image pickup apparatus of claim 25, wherein the following relationship is satisfied:

$Ra \geq f/6$, where Ra corresponds to a length of the aperture stop in the second direction and f corresponds to a focal length of the telephoto lens.

27. The image pickup apparatus of claim 25, wherein the image pickup apparatus is configured to compensate image deterioration of a captured image in a vertical direction based on a difference between a point spread function (PSF) value of the telephoto lens in a horizontal direction and a PSF value of the telephoto lens in the vertical direction.

28. The image pickup apparatus of claim 22, wherein the following relationship is satisfied:

$L1/D1\_s \geq 1$, where $D1\_s$ corresponds to a smallest effective aperture of the first lens element.

29. The image pickup apparatus of claim 22, wherein the following relationship is satisfied:

$1 < TTL/EFL \leq 2$, where TTL corresponds to a total length of the telephoto lens and EFL corresponds to an effective focal length.

30. The telephoto lens of claim 2, wherein the image plane of the telephoto lens extends in a direction substantially parallel with the second optical path.

31. The telephoto lens of claim 1, wherein the telephoto lens further comprises a mirror configured to reflect light that passed through the first lens group.

* * * * *